United States Patent
Noordegraaf et al.

(10) Patent No.: US 11,591,756 B2
(45) Date of Patent: Feb. 28, 2023

(54) ARTIFICIAL TURF SUITABLE FOR SPORTS FIELDS

(71) Applicants: BEWISYNBRA RAW B.V., Etten-Leur (NL); SALTEX OY, Alajärv (NL)

(72) Inventors: Jan Noordegraaf, Etten-Leur (NL); Anjo Antonius Johannes Van Der Wende, Heesch (NL); Hannu Tapani Salmenautio, Alajarvi (FI)

(73) Assignees: Bewisynbra Raw B.V., Etten-Leur (NL); SalTex Oy, Alajärv (FI)

( * ) Notice: Subject to any disclaimer, the term of this patent is extended or adjusted under 35 U.S.C. 154(b) by 606 days.

(21) Appl. No.: 16/611,324

(22) PCT Filed: May 8, 2018

(86) PCT No.: PCT/NL2018/050298
§ 371 (c)(1),
(2) Date: Nov. 6, 2019

(87) PCT Pub. No.: WO2018/208150
PCT Pub. Date: Nov. 15, 2018

(65) Prior Publication Data
US 2020/0165784 A1  May 28, 2020

(30) Foreign Application Priority Data

May 8, 2017  (NL) .................................... 2018864

(51) Int. Cl.
*E01C 13/08* (2006.01)
*C08J 9/12* (2006.01)
*C08J 9/18* (2006.01)
*C08J 9/228* (2006.01)

(52) U.S. Cl.
CPC ............... *E01C 13/08* (2013.01); *C08J 9/122* (2013.01); *C08J 9/18* (2013.01); *C08J 9/228* (2013.01); *C08J 2203/06* (2013.01); *C08J 2207/00* (2013.01); *C08J 2367/04* (2013.01)

(58) Field of Classification Search
CPC .... E01C 13/08; C08J 9/122; C08J 9/18; C08J 9/228; C08J 2203/06; C08J 2207/00; C08J 2367/04; C08J 2300/16; C08J 9/224
See application file for complete search history.

(56) References Cited

U.S. PATENT DOCUMENTS

2011/0135851 A1 *  6/2011  Dozeman .................. B29B 9/12
428/313.5

FOREIGN PATENT DOCUMENTS

| KR | 10-1363360 | 2/2014 | |
|---|---|---|---|
| WO | 2013/062416 | 5/2013 | |
| WO | 2016/190744 | 12/2016 | |
| WO | WO-2016190744 A1 * | 12/2016 | ............. A41G 1/009 |
| WO | 2018/016956 | 1/2018 | |

OTHER PUBLICATIONS

Al-Hashemi et al., "A review on the angle of repose of granular materials," Powder Technology, 330 (2018), 397-417 (Year: 2018).*

* cited by examiner

*Primary Examiner* — Kara B Boyle
(74) *Attorney, Agent, or Firm* — Casimir Jones, SC; Robert A. Goetz

(57) ABSTRACT

The present invention relates to an artificial turf suitable for sports fields consisting at least of a substrate to which first artificial grass fibres are attached and of a granular infill, which is provided between said first artificial grass fibres, wherein said granular infill is made of a foam material comprising polylactic acid or a derivative thereof.

17 Claims, No Drawings

ARTIFICIAL TURF SUITABLE FOR SPORTS FIELDS

The present invention relates to an artificial turf suitable for sports fields consisting at least of a substrate to which first artificial grass fibres are attached and of a granular infill, which is provided between said first artificial grass fibres.

Increasing demand for high quality playing surfaces and intense competition for field accessibility has given rise to a new generation of synthetic turf systems that replicate the look and feel of lush, natural grass. While the first artificial turf systems used in the 1960's and 1970's were hard, significant advancements have been made during the past few decades. By the 1990's, the first synthetic turf systems with sand and rubber infill were introduced, which dramatically improved player performance and safety. Today's synthetic turf, used by many NFL franchises, as well as member associations and teams of the Union of European Football Associations (UEFA), Federation Internationale de Football Association (FIFA), the International Rugby Board and other international sports federations, combines the playing characteristics, look and feel of natural turf, with the advantages of increased frequency of usage, extra revenue generation, safety, longer playing sessions, fewer cancelled games, and lowest cost per playing day.

Rubber infill helps to support grass fibres, adds ballast and an extra layer of fall protection for the players. Infill is required for support the grass fibres and add dimensional stability. Top-dressing or ballast is a standard requirement to add weight. If infill is required, it means the grass itself may not be able to withstand typical daily traffic and activity without the added support.

Silica sand or acrylic coated sand are one of the most commonly used products to add ballast to artificial grass. Other products are for example crumb rubber which is derived from scrap car and truck tires that are ground up and recycled. Two types of crumb rubber infill exist: ambient and cryogenic. Together these make up the most widely used infill in the synthetic sports field and landscape market. Crumb rubber infill is substantially metal free, and, according to the STC Guidelines for Crumb Rubber Infill, should not contain liberated fibre. Another type of infill is coated rubber infill: both ambient and cryogenic rubber can be coated with colorants, sealers, or anti-microbial substances if desired. Coated rubber provides additional aesthetic appeal, reduction of dust by products during the manufacturing process and complete encapsulation of the rubber particle. Another type of infill is EPDM (Ethylene Propylene Diene Monomer), i.e. a polymer elastomer with high resistance to abrasion and wear and will not change its solid form under high temperatures. Typical EPDM colours are green and tan. EPDM has proven its durability as an infill product in all types of climates. Its excellent elasticity properties and resistance to atmospheric and chemical agents provide a stable, high performance infill product. There are also organic infill materials, such as natural cork and/or ground fibres from the outside shell of the coconut. These products can be utilized in professional sports applications as well as for landscaping. At the end of its life cycle it can be recycled directly into the environment.

As mentioned before, sand (silica) infill is one of the original infilling materials utilized in synthetic turf. This product is a natural infill that is non-toxic, chemically stable and fracture resistant. Silica sand infills are typically tan, off-tan or white in color and—depending upon plant location—may be round or sub-round in particle shape. As a natural product there is no possibility of heavy metals, and the dust/turbidity rating is less than 100. It can be used in conjunction with many other infills on the market to provide a safe and more realistic playing surface. The round shape plays an integral part in the synthetic turf system. It is important that silica sand have a high purity (greater than 90%) to resist crushing and absorption of bacteria and other field contaminants. Silica sand can either be coated with different materials as a standalone product or can be used to firm up in combination with traditional crumb rubber infill systems. The class of coated silica sand infill consists of coated, high-purity silica sand with either a soft or rigid coating specifically engineered for synthetic turf. These coatings are either elastomeric or acrylic in nature (non-toxic) and form a bond with the sand grain sealing it from bacteria to provide superior performance and durability over the life of a field. Coated sand is available in various sizes to meet the application's needs. Another type of infill is thermoplastic elastomer (TPE) infill. TPE infill is non-toxic, heavy metal free, available in a variety of colours that resist fading, very long lasting, and 100% recyclable and reusable as infill when the field is replaced. A new class of infill materials is the group of zeolites, i.e. naturally occurring minerals found in specific types of sedimentary rocks. The use of zeolites was of particular interest to the synthetic grass industry since it is certified organic and therefore poses no safety concerns.

Infill materials for artificial grass are known from EP 2 206 833, KR 2014/0088378, KR 101363360, EP 0 377 925, U.S. Pat. Nos. 5,976,645, 5,958,527, 4,337,283, 3,731,923, JP-A-10037122, EP-A-1 158 099, WO-A-2006/109110 and WO-2007/010234.

WO 2016/190744 as an intermediate document relates to an artificial turf system comprising: a resilient layer; an artificial grass layer comprising a substrate and pile fibres upstanding from the substrate; an infill layer, disposed on the substrate and interspersed between the pile fibres, the infill layer comprising smooth, hard granules having a mean size of between 2.0 mm and 10 mm, a surface hardness of greater than Shore D 45, wherein the granules comprise a thermoplastic material, selected from the group comprising: PE, PP, PA, PU, PS, ABS, PC, PET, PEF, PHA and PLA.

U.S. Pat. No. 6,818,274 relates to various formulations of infill interspersed among the turf fibres on the backing to simulate the presence of soil, wherein the particulate matter of the infill layer may include both hard granules or particles, such as sand, rocks or other hard particles, as well as resilient particles. Infill layer may also include one or more layers that include a mixture of hard and resilient particles. The resilient particles may be particles of rubber, such as butyl rubber, nitrile rubber, crumb rubber or ground tire rubber, cryogenic rubber particles, neoprene, polyethylene foam, or any other resilient particles.

WO 2009/118390 relates to the use of a polymeric material as infill in (artificial) turf fields, the polymeric material having a dynamic modulus (Ed) of between 0.5 and 2.0 MPa and a phase angle (tan δ) of between 0.19 and 0.36 comprises foamed polymeric particles and/or extruded non-spherical polymeric particles.

US 2014/322459 relates to an artificial grass turf system, wherein the infill layer comprises a first infill layer on the backing, the first infill layer predominantly comprising granular material, rubber particles or a mixture thereof; and a second infill layer placed substantially over the first infill layer, the second infill layer predominantly comprising a granular material, rubber particles or a mixture thereof wherein at least a portion of the second infill layer particles are synthetic turf infill cooling granules predominantly fabricated from one of either resilient or inelastic core particles.

US 2003/161996 relates to a synthetic grass assembly wherein the infill layer comprises: a bottom course of intermixed hard and resilient granules, disposed upon the top surface of the backing; and a top course substantially exclusively of resilient granules disposed upon the bottom course, wherein the resilient granules are selected from the group consisting of: cryogenically ground rubber; rubber; cork; polymer beads; synthetic polymer foam; styrene; perlite, neoprene, and EPDM rubber, and wherein the hard granules are selected from the group consisting of: sand; hard aggregate; silica sand; gravel; slag; granulated plastic; and polymer beads.

JP 2010-275787 relates to an artificial turf including a granular material layer by filling a granular material between inserted turf threads, wherein at least the surface part of the granular material layer is provided with an elastic layer comprising an elastic foam granular material having a specific gravity of 1 or larger and including an independent foaming structure.

The use of an infill in artificial grass sports fields has a number of drawbacks. For example, an artificial grass sports field provided with an infill requires intensive maintenance. The initially uniform distribution of the granular infill can be disturbed by intensive usage. As a result, areas containing hardly any infill may form in particular in places where the field is played on very intensively, for example in the goal area, which has an adverse effect on the quality of play, but which above all leads to an increased risk of injury. The distribution and the amount of the granular material of an artificial grass sports field provided with an infill must be verified at regular intervals and repairs must be carried out, if necessary. Furthermore it has become apparent that the weather influences affect the properties of the infill with the passage of time, which has a negative effect on the quality of the infill and thus on the playing characteristics of the artificial grass sports field. A negative factor, for example, is the strong compaction of the infill, as a result of which the artificial grass sports field will feel increasingly hard during play, with an increased risk of injury. Furthermore, the synthetic infill may change (harden or become brittle) under the influence of the weather conditions (sunlight, for example).

An object of the present invention is to provide an infill in artificial grass sports fields that will overcome or minimize one or more of the afore mentioned drawbacks.

An object of the present invention is to provide an infill in artificial grass sports fields that fulfils the requirements of the international sports federations, such as FIFA and UEFA, and has its origin in biobased materials.

The present invention relates thus to an artificial turf suitable for sports fields consisting at least of a substrate to which first artificial grass fibres are attached and of a granular infill, which is provided between said first artificial grass fibres, wherein said granular infill is made of a biobased and/or biodegradable foam material like polylactic acid (PLA), polybutylene succinate (PBS), polycaprolactone (PCL), poly(3-hydroxybutyrate-co-3-hydroxyvalerate) (PHBV), polyhydroxyalkanoate (PHA) and polyhydroxybutyrate (PHB), polyethylene (PE), polypropylene (PP), or a derivative thereof.

By using a granular infill made on basis of this group of components one or more of the aforementioned objects are achieved. Methods for manufacturing products from polylactic acid (PLA) are disclosed in WO 2014/158014, EP-A-2 334 719 and EP-A-2 137 250, all in the name of the present applicant. Expandable polylactic acid resin particles have been disclosed in EP-A-1 683 828. An example of a method for producing a starting material from which a foamed moulded product can be formed, which starting material is based on particulate expandable polystyrene (EPS) has been disclosed in EP-A-1 930 365. The contents of these documents are considered to be included here.

In a preferred embodiment the granular infill further comprises one or more oil-based polymers chosen from the group of foamed polyethylene terephthalate(PET), polyethylene foam (PEF), polyethylene (PE), such as LDPE, HDPE, LLDPE, polystyrene (PS) and poly(vinyl chloride) (PVC).

Bio-based granular infill according to the present invention is preferably based on polylactic acid and/or combinations with polybutylene succinate (PBS), polycaprolactone (PCL), poly(3-hydroxybutyrate-co-3-hydroxyvalerate) (PHBV), polyhydroxyalkanoate (PHA), polyethylene (PE), polypropylene (PP), and polyhydroxybutyrate (PHB) and the thus composed granular infill will also be bio-degradable.

In another preferred embodiment the granular infill further comprises one or more fossil-based polymers chosen from the group of copolyester of butandiol, adipic acid and terephtalic acid (PBAT), poly(methyl methacrylate), polystyrene and polyolefins. The thus composed granular infill will be qualified as partly bio based granules. The present inventors found that the use of PBAT provides partially bio-based granules that are still biodegradable.

The granular infill may further comprise one or more materials chosen from the group of starch, natural fillers, such as cork, coconut, hemp, grass, cellulose, reed, hay, straw and cardboard. Fillers are added to amend the hydrophilic and/or hydrophobic character of the granules. Bio-based granules based on polylactic acid with natural fillers like cork, coconut, hemp, grass, cellulose, reed, hay, straw and cardboard are identified as biodegradable.

The granular infill may further comprise one or more mineral fillers chosen from the group of zeolites, calcium carbonate, silicon dioxide, aluminum oxide, magnesium oxide, chalk, kaolin and talc. These fillers may be added to increase the density of the granular infill. In addition, bio-based granules, e.g. the present granular infill based on polylactic acid with mineral fillers like zeolites, calcium carbonate, silicon dioxide, aluminum oxide, magnesium oxide, chalk, kaolin and talc can be identified as a biodegradable granular infill.

In a preferred embodiment of the present invention the infill comprises one or more additives chosen from the group of antistatic additives, hydrophilic additive, algaecide and pigments. These additives are necessary for increasing the performance of the infill. Examples of an antistatic additive are polyamide, polyether block amide, polyester block copolymer, a glycerol ester, a synthetic amine or an alkyl sulphonate. An example of a hydrophilic additive is ethylene vinyl alcohol copolymer and polyhydroxyethyl methacrylate. An algaecide is especially used for killing and preventing the growth of algae.

In a preferred embodiment of the present invention the granular infill is provided in a density of 60-500 kg/m$^3$, preferably 60-300 kg/m$^3$, more preferably 80-150 kg/m$^3$, even more preferably 120-140 kg/m$^3$. If the density is below the lower value, the infill will be blown away from the sports field under windy conditions. A density higher than the upper value will result in too dense particles, the dense particles will negatively influence the resilience properties of the artificial turf. In another embodiment the shape of the present foam material is round, oblong or cylindrical with an aspect ratio of L/D of 3 and higher.

In another embodiment the granular infill has a diameter in a range of 0,5-5 mm, preferably in a range of 2-3 mm. A suitable diameter is about 1.5 mm. Such a diameter is preferred since the artificial turf blades are positioned in the backing in a specific spacing. A diameter higher than 5 mm will have the effect that the infill cannot be placed between the artificial turf blades.

In another embodiment the shape of said granular infill is chosen from the group of coffee bean, cylindrical or oblong, preferably the shape of said granular infill is coffee bean. The present inventors found that the value for rotational friction is surprisingly high, i.e. at least 30, when the shape of the granular infill is coffee bean. The shape of "coffee bean" is to be understood as elliptical with a notch over the longitudinal axis. The shape of "coffee bean" is thus different from the cylindrical shape since the cylindrical shape lacks the characteristic notch of the coffee bean. Official test methods have been published and can be found in FIFA Quality Programme—3—Handbook of Test Methods for Football Turf, October 2015 V2.5 (26.06.17). The relevant content of that handbook is incorporated here by reference.

The present inventors found that the parameter rotational friction can be further improved when the outer surface of said granular infill has undergone a roughened treatment. The outer surface of said granular infill thus obtained can be identified as an orange skin or orange peel.

In another embodiment the outer surface of said granular infill is provided with a coating, such as antistatic silicone or a polyurethane (manufactured by Stahl).

It has been found that spherical beads show the lowest friction and irregular shaped beads like sticks, tablets, cashew nuts, beads with dimples and the shape of coffee beans show higher friction values. Coffee beans yield the best results. The friction values can be further improved by adding fillers in the present granular infill or by surface coatings.

The present invention furthermore relates to granular infill for use in artificial turf suitable for sports fields, the granular infill being made of a foam material comprising polylactic acid or a derivative thereof.

The present invention furthermore relates to the use of the present granular infill in artificial turf suitable for sports fields. Examples of such sports fields are soccer, rugby and field hockey. The present infill can be used in artificial grass for landscape applications as well.

The invention will now be described by way of non-limiting examples.

EXAMPLE 1

Polylactic (PLA) microbeads have been prepared on a Berstorff ZE75A_UTX x 36D twin-screw extruder equipped with a Gala underwater granulator (A6). The PLA used was Synterra BF1505 prepared by Synbra Technology. The PLA microbeads have been impregnated in a pressure vessel at 13 bar $CO_2$ for 18 hours to absorb blowing agent. Pre-foaming of the impregnated microbeads has been done on a commercial EPS prefoamer using a mixture of steam and air to obtain an average pre-foaming temperature of 95° C. The pre-foaming time was 40 sec, which was sufficient to obtain a density of 60 g/L and the right surface modification. After pre-foaming the foamed beads have been coated with 0.5% of a 35% solids content active food grade silicone emulsion (marketed by Van Meeuwen as Food care (trademark) Antiblock).

EXAMPLE 2

PLA microbeads have been prepared on a Berstorff ZE75A_UTX x 36D twin-screw extruder equipped with a Gala underwater granulator (A6). The PLA used was Synterra BF1505 prepared by Synbra Technology. The PLA microbeads have been impregnated in a pressure vessel at 10 bar $CO_2$ for 18 hours to absorb blowing agent. Pre-foaming of the impregnated microbeads has been done on a commercial EPS prefoamer using a mixture of steam and air to obtain an average pre-foaming temperature of 95° C. The pre-foaming time was 40 sec, which was sufficient to obtain a density of 140 g/L and the right surface modification. After pre-foaming the foamed beads have been coated with 0.5% of 35% solids content active food grade silicone emulsion (marketed by Van Meeuwen as Foodcare (trademark) Antiblock).

EXAMPLE

A commercial available artificial turf was provided with the foam material as manufactured according to Example 1 and 2.

The granular infill manufactured according to Example 1 and Example 2 is provided between the synthetic fibers of the artificial turf. The artificial turf as used in Example 3 includes a pile fabric having a backing and pile elements extending upwardly from the backing, and an infill layer filled on the backing such that the pile elements are at least partially embedded in the infill layer composed of the foam material as manufactured according to Example 1 and 2.

The artificial turf having the foam material as manufactured according to Example 1 and 2 as infill has acceptable elasticity, hardness, and sliding resistance, so that it is possible to prevent the players from being injured and improve playability.

The value for Rotational resistance should be high, i.e. at least 20.

Table 1 discloses experimental results for different types of granular infill, such as polypropylene (PP), recycled polyethylene terephthalate (rPET), polyethylene (PE), polystyrene (PS) and polylactic acid (PLA).

TABLE 1 experimental results for different types of granular infill

| polymer type | recipe | extruder speed kg/hr | technique | blowing agent | shape | % addition blowing agent | density | Rotational resistance |
|---|---|---|---|---|---|---|---|---|
| PP | 20/50/30 blend of PP531PH/WB135HMS/ LDPE 2202U0 | 1 | in/line foaming | isobutane | spherical | 3% | 240 | 23 |

TABLE 1-continued experimental results for different types of granular infill

| polymer type | recipe | extruder speed kg/hr | technique | blowing agent | shape | % addition blowing agent | density | Rotational resistance |
|---|---|---|---|---|---|---|---|---|
| rPET | rPET: recycled PET flakes PET bottle grade | 1 | in/line foaming | cyclopentane | spherical | 4% | 300 | 27 |
| rPET | rPET: recycled PET flakes PET bottle grade | 1 | in/line foaming | cyclopentane | coffeebean | 4% | 450 | 35 |
| PP | 25/45/30 blends of linear PP531PH/WB135HMS/ LDPE 2202U0 | 1 | in/line foaming | isobutane | spherical | 7% | 30 | nd |
| PE | LDPE 2202U0 | 1 | in/line foaming | isobutane | cillinder LD/3 | 3% | 330 | 20 |
| PS | Styrex EPS 1012RC | 1 | in/line foaming | pentane | spherical | 5.6% | 60 | nd |
| PLA | BF2004 plus 1% talc | 5 | in/line foaming | CO2 | spherical | 7% | 600 | 26 |
| PLA | BF2004 + 20% Ecovio C2332 + 1.5% talc | 5 | in/line foaming | CO2 | coffeebean | 6% | 500 | 28 |
| PLA | BF2004 + 20% Ecoflex + 1.5% talc | 5 | in/line foaming | pentane | spherical | 4% | 300 | 31 | polymer type recipe
PP 20/50/30 blend of PP531PH/WB135HMS/LDPE 2202U0
rPET rPET: recycled PET flakes PET bottle grade
rPET rPET: recycled PET flakes PET bottle grade
PP 25/45/30 blends of linear PP531PH/WB135HMS/LDPE 2202U0
PE LDPE 2202U0
PS Styrex EPS 1012RC
PLA BF2004 plus 1% talc
PLA BF2004 + 20% Ecovio C2332 + 1.5% talc
PLA BF2004 + 20% Ecoflex + 1.5% talc
BASF Ecovio C2332 is a mixture of 82% PBAT and 18% PLA
Sabic ® PP 531Ph (homopolymer, 3 g/10 min @ 230° C., 2.16 kg);
Sabic ® PP 620P (random copolymer, 17 g/10 min);
Borealis PP WB135HMS (homopolymer, 2.4 g/10 min);
Borealis PP WB260HMS (random copolymer, 2.4 g/10 min);
Borealis PP HB600TF (homopolymer, 2 g/10 min, Tm = 162-166° C.).
SABIC ® LDPE 2202U0 (high melt strength)
Styrex EPS 1012RC Synbra technology
Synterra BF2004 Synbra Technology
n.a not applicable
nd not determined

The invention claimed is:

1. An artificial turf suitable for sports fields comprising a substrate to which first artificial grass fibers are attached and a granular infill between said first artificial grass fibers, wherein said granular infill comprises a biobased and/or biodegradable foam material selected from the group consisting of polylactic acid (PLA), polybutylene succinate (PBS), polycaprolactone (PCL), poly(3-hydroxybutyrate-co-3-hydroxyvalerate) (PHBV), polyhydroxyalkanoate (PHA) and polyhydroxybutyrate (PHB), polyethylene (PE), polypropylene (PP), or a derivative thereof, and wherein the outer surface of said granular infill has undergone a roughened treatment.

2. An artificial turf according to claim 1, wherein said granular infill further comprises one or more oil-based polymers selected from the group consisting of foamed polyethylene terephthalate(PET), polyethylene foam (PEF), polyethylene (PE), LDPE, HDPE, LLDPE, polystyrene (PS) and poly(vinyl chloride) (PVC).

3. An artificial turf according to claim 1, wherein said granular infill further comprises one or more fossil-based polymers selected from the group consisting of copolyester of butanediol, adipic acid and terephtalic acid (PBAT), poly(methyl methacrylate), polystyrene and polyolefins.

4. An artificial turf according to claim 1, wherein said granular infill further comprises one or more materials chosen from the group of starch, natural fillers, wherein the natural fillers are selected from cork, coconut, hemp, grass, cellulose, reed, hay, straw and cardboard.

5. An artificial turf according to claim 1, wherein said granular infill further comprises one or more mineral fillers chosen from the group of zeolites, calcium carbonate, silicon dioxide, aluminum oxide, magnesium oxide, chalk, kaolin and talc.

6. An artificial turf according to claim 1, wherein said granular infill further comprises one or more additives chosen from the group of antistatic additives, hydrophilic additive, algaecide and pigments.

7. An artificial turf according to claim 1, wherein the granular infill is provided in a density of 60-500 kg/m$^3$.

8. An artificial turf according to claim 7, wherein the granular infill is provided in a density of 60-300 kg/m$^3$.

9. An artificial turf according to claim 7, wherein the granular infill is provided in a density of 80-150 kg/m$^3$.

10. An artificial turf according to claim 7, wherein the granular infill is provided in a density of 120-140 kg/m$^3$.

11. An artificial turf according to claim 1, wherein the shape of said foam material is round, oblong or cylindrical with an aspect ratio of L/D of 3 and higher.

12. An artificial turf according to claim 1, wherein said granular infill has a diameter in a range of 0.5-5 mm.

13. An artificial turf according to claim 12, wherein said granular infill has a diameter in a range of 2-3 mm.

14. An artificial turf according to claim 1, wherein the shape of said granular infill is chosen from the group of coffee bean, cylindrical or oblong.

15. An artificial turf according to claim 14, characterized in that the shape of said granular infill is coffee bean.

16. An artificial turf according to claim 1, wherein the outer surface of said granular infill is provided with a coating.

17. An artificial turf suitable for sports fields comprising a substrate to which first artificial grass fibers are attached and of a granular infill, which is provided between said first artificial grass fibers, wherein said granular infill is made of a biobased and/or biodegradable foam material, wherein the biobased and/or biodegradable foam material is selected from the group consisting of polylactic acid (PLA), polybutylene succinate (PBS), polycaprolactone (PCL), poly(3-hydroxybutyrate-co-3-hydroxyvalerate) (PHBV), polyhydroxyalkanoate (PHA) and polyhydroxybutyrate (PHB), polyethylene (PE), polypropylene (PP), or a derivative thereof, wherein the outer surface of said granular infill has undergone a roughened treatment.

* * * * *